United States Patent
Li et al.

(10) Patent No.: US 8,837,054 B2
(45) Date of Patent: Sep. 16, 2014

(54) LIQUID LENS

(71) Applicants: Tsinghua University, Beijing (CN); Hon Hai Precision Industry Co., Ltd., New Taipei (TW)

(72) Inventors: Jie Li, Beijing (CN); Kai-Li Jiang, Beijing (CN); Shou-Shan Fan, Beijing (CN)

(73) Assignees: Tsinghua University, Beijing (CN); Hon Hai Precision Industry Co., Ltd., New Taipei (TW)

( * ) Notice: Subject to any disclaimer, the term of this patent is extended or adjusted under 35 U.S.C. 154(b) by 0 days.

(21) Appl. No.: 13/908,112

(22) Filed: Jun. 3, 2013

(65) Prior Publication Data

US 2013/0321929 A1 Dec. 5, 2013

(30) Foreign Application Priority Data

Jun. 4, 2012 (CN) .......................... 2012 1 0185456

(51) Int. Cl.
*G02B 3/14* (2006.01)
*B82Y 20/00* (2011.01)

(52) U.S. Cl.
CPC . *G02B 3/14* (2013.01); *B82Y 20/00* (2013.01); *Y10S 977/742* (2013.01)
USPC .......................................... 359/666; 977/742

(58) Field of Classification Search
CPC ................................. G02B 3/14; B82Y 20/00
USPC .......................................... 359/666; 977/742
See application file for complete search history.

(56) References Cited

U.S. PATENT DOCUMENTS

| | | | |
|---|---|---|---|
| 7,431,518 B2 * | 10/2008 | Kato et al. | 396/506 |
| 7,768,713 B2 * | 8/2010 | Yu et al. | 359/666 |
| 2013/0177823 A1 * | 7/2013 | Nguyen et al. | 429/411 |
| 2013/0321928 A1 * | 12/2013 | Li et al. | 359/665 |

* cited by examiner

*Primary Examiner* — David N Spector
(74) *Attorney, Agent, or Firm* — Novak Druce Connolly Bove + Quigg LLP

(57) ABSTRACT

A liquid lens includes a sealed shell, a gaseous material, a transparent carbon nanotube structure within the gaseous material, a liquid material, and a first electrode and a second electrode, a voltage being applied to the carbon nanotube structure causes rapid heating, which is transferred to the gaseous material to change the pressure thereof.

20 Claims, 6 Drawing Sheets

LIQUID LENS

RELATED APPLICATIONS

This application claims all benefits accruing under 35 U.S.C. §119 from China Patent Application No. 201210180545.6, filed on Jun. 4, 2012 in the China Intellectual Property Office, entire contents of which is hereby incorporated by reference.

BACKGROUND

1. Technical Field

The present disclosure relates to liquid lens, and particularly to a liquid lens with a carbon nanotube structure.

2. Description of Related Art

By controlling the meniscus (the surface of the liquid), a liquid lens uses one or more fluids to create a lens of infinitely variable shapes in relation to a focal length and other optical properties without any moving parts. There are two primary types of liquid lenses—transmissive and reflective, which are not to be confused with liquid-formed lenses that are created by placing a drop of plastic or epoxy on a surface and then allowed to be hardened into a lens shape.

According to different structures and principles, liquid lenses can be roughly classified into three types: (1) double liquid layer liquid lens based on electro-wetting principle; (2) single liquid layer liquid lens which shape can be changed by mechanical force; and (3) liquid crystal lens which reflective ratio can be changed by applying an electric field to change the alignment of the liquid crystals of the liquid crystal lens.

Compared with traditional variable-focus lenses, the liquid lens has less mechanical structures. Liquid lenses are small, quick responding, energy efficient, and durable. Therefore, liquid lenses have been widely applied in the fields of mobile phone, digital camera, as electronically controllable variable focus systems.

However, double liquid layer liquid lenses usually have complex structures, and high costs. Single liquid layer liquid lenses are difficult to control, and have poor stabilities. Liquid crystal lenses having high costs may limit the applications of the liquid crystal lenses.

Therefore, a liquid lens of a lower cost, higher precision, higher efficiency, and user friendly is desired within the art.

BRIEF DESCRIPTION OF THE DRAWINGS

Many aspects of the embodiments can be better understood with reference to the following drawings. The components in the drawings are not necessarily drawn to scale, the emphasis instead being placed upon clearly illustrating the principles of the embodiments. Moreover, in the drawings, like reference numerals designate corresponding parts throughout the several views.

DETAILED DESCRIPTION

The disclosure is illustrated by way of example and not by way of limitation in the figures of the accompanying drawings in which like references indicate similar elements. It should be noted that references to "an" or "one" embodiment in this disclosure are not necessarily to the same embodiment, and such references mean "at least one."

Figure 1:
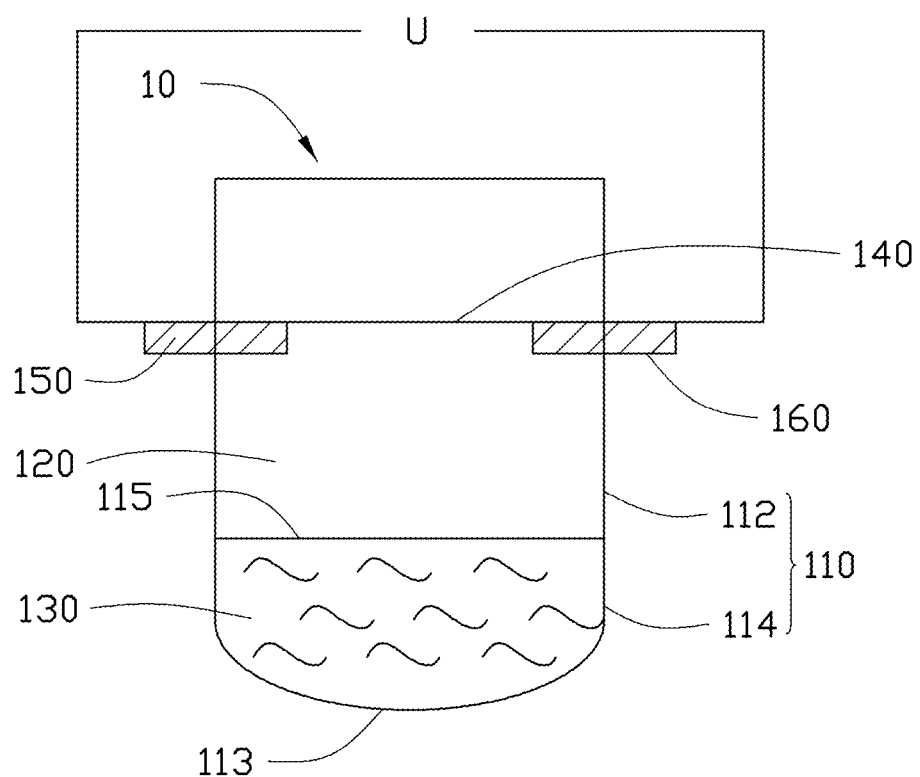
FIG. 1 shows a cross-sectional view of a liquid lens of one embodiment.
Figure 2:
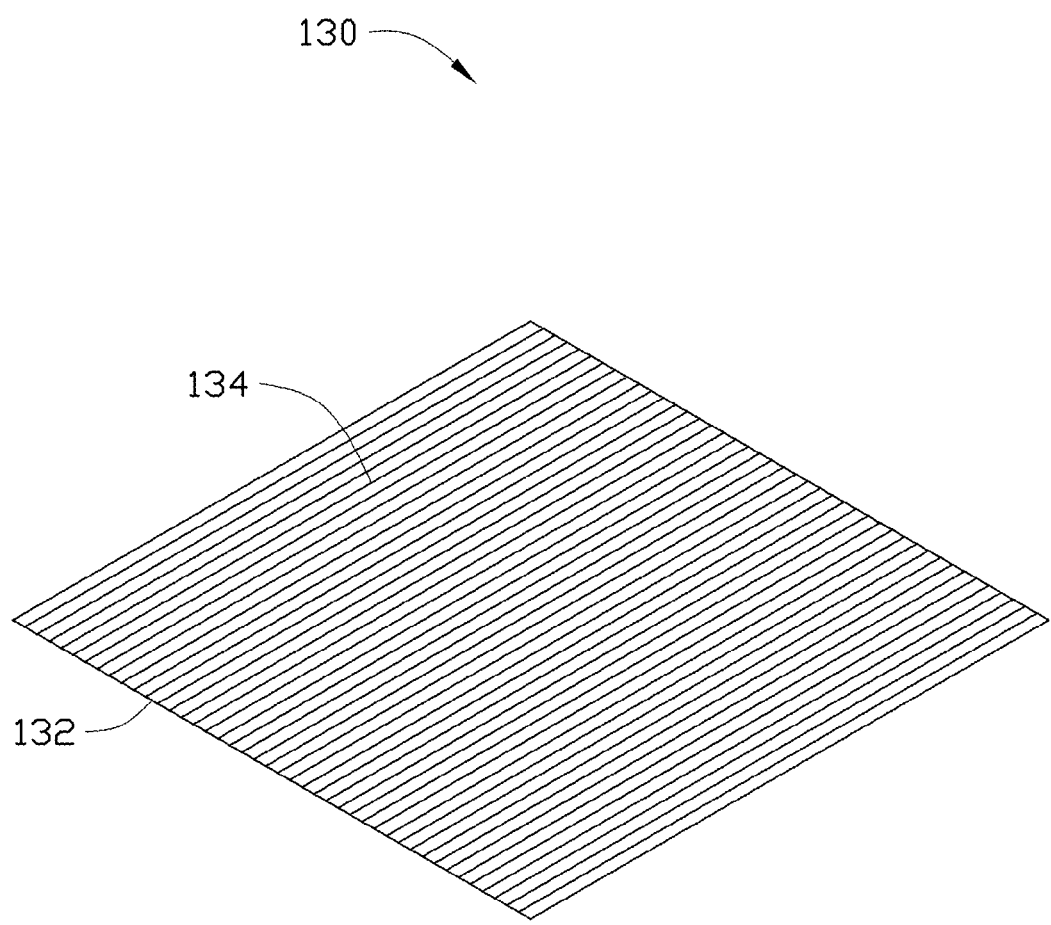
FIG. 2 shows one carbon nanotube structure of the liquid lens of FIG. 1.

FIG. 1 is one embodiment of a liquid lens 10. The liquid lens 10 includes a sealed shell 110, a gaseous material 120, a liquid material 130, a carbon nanotube structure 140, a first electrode 150 and a second electrode 160. The gaseous material 120 and the liquid material 130 are sealed in the sealed shell 110, and separated with each other by a membrane 115. The carbon nanotube structure 140 is sealed in the sealed shell 110, and intermixed with the gaseous material 120. The carbon nanotube structure 140 is spaced with the liquid material 130 by the membrane 115. About 50% to 90% of the volume of the sealed shell 110 is filled with the liquid material 130, and an air space is defined in the sealed shell 110. The air space is full with the gaseous material 120. The air space occupies about 10% to about 50% of the volume of the sealed shell 110. The first electrode 150 and the second electrode 160 are separately located at two opposite sides of the sealed shell 110, and are electrically connected to the carbon nanotube structure 140. A voltage can be applied to the carbon nantotube structure 130 via the first electrode 150 and the second electrode 160 to cause heating of the gaseous material 120.

The sealed shell 110 holds the gaseous material 120, the liquid material 130 and the carbon nanotube structure 140. The sealed shell 110 includes a hard portion 112 and a soft portion 114. In one embodiment, the hard portion 112 is a cylinder; the soft portion 114 is half convex shape structure.

The hard portion 112 is made of rigid materials, such as glass, quartz, plastic or resin. The rigid materials of the hard portion 112 make sure the hard portion 112 would not easy to deform, the efficiency and stability of liquid lens 10 is maintained. In one embodiment, the hard portion 112 is made of a transparent non-conductive hard glass. The soft portion 114 is made of flexible materials. The flexible material make sure the soft portion 114 can be deformed under small pressure, to achieve the purpose of changing the focus length of the liquid lens 10. The flexible material can be a flexible polymer material, such as polytene, polypropylene, polymethylmethacrylate. In one embodiment, the soft portion 114 is made of a polymethylmethacrylate membrane. In one embodiment, the soft portion 114 has a convex shape, and defines a convex surface 113. The diameter of the sealed shell 110 can be in a range from about 10 millimeter to about 10 centimeters.

The material of the liquid material 130 is not limited to a single material or type of material, and can be electrolyte solution, solution of non-electrolyte, organic solution, inorganic solution, hydrophilic solution and oleophylic solution. In one embodiment, the liquid material 130 is preferable an oleophylic solution with high viscosity. When the liquid material 130 has a high viscosity, a contacting angle between the liquid material 130 and the sealed shell 110 is great, so the liquid lens 10 can have a wide focus length adjustable range. In one embodiment, the viscosity of the oleophylic solution greater than $10^{12}$ Pa·s.

The liquid material 130 is located in the soft portion 114 of the sealed shell 110. The volume of the liquid material 130 is equal to or less than the volume of the soft portion 114. In one embodiment, the volume of the liquid material 130 is equal to the volume of the soft portion 114.

The gaseous material 120 is a nonoxidizing gas, such as nitrogen, hydrogen, or inert gas. In one embodiment, the gaseous material 120 is argon. The pressure of the gaseous material 120 is in a range from 0.5 atmospheres to 1.5 atmospheres.

The membrane 115 is a transparent thin flexible film used to separate the gaseous material 130 with the liquid material 130. The membrane 115 can be made of plastic, resin, or polymer.

The first electrode 150 and the second electrode 160 are in electrical contact with the carbon nanotube structure 140, and a voltage can be applied to the carbon nanotube structure 140 via the first electrode 150 and the second electrode 160. The first electrode 150 and the second electrode 160 are made of conductive material. The shapes of the first electrode 150 and the second electrode 160 are not limited and can be lamellar, rod, wire, and block like, among other shapes. A material of the first electrode 150 and the second electrode 160 can be metal, conductive adhesive, carbon nanotube, and indium tin oxide, among other conductive materials. In one embodiment, the first electrode 150 and the second electrode 160 are lamellar metal.

The carbon nanotube structure 140 has a low heat capacity per unit area, which is less than or equal to about $1.7 \times 10^{-6}$ $J/cm^2 * K$. The temperature of carbon nanotube structure 140 changes rapidly in response to voltage changes applied to the carbon nanotube structure 140.

The carbon nanotube structure 140 is transparent and free-standing sheet structure which is also flexible. The carbon nanotube structure 140 can be permeated by the gaseous material 120 and supported by the first electrode 150 and the second electrode 160. In one embodiment, opposite sides of carbon nanotube structure 140 are fixed on the first electrode 150 and the second electrode 160 by a conductive adhesive. The size of the carbon nanotube structure 140 is not limited, provided there is complete physical contact with the liquid material 130. The thickness of the carbon nanotube structure can be in a range from about 10 nanometers to about 50 micrometers. The heat capacity per unit area of the carbon nanotube structure 140 can be less than $2 \times 10^{-4}$ $J/cm^2 * K$. In one embodiment, the heat capacity per unit area of the carbon nanotube structure 140 is less than or equal to about $1.7 \times 10^{-6}$ $J/cm^2 * K$.

Referring to FIG. 2 to FIG. 5, the carbon nanotube structure 140 can be a single drawn carbon nanotube film 132, or more than one drawn carbon nanotube films 132 stacked on each other. The drawn carbon nanotube film 132 can be obtained by pulling from a carbon nanotube array. The drawn carbon nanotube film 132 includes a plurality of carbon nanotubes joined end to end by van der Waals force along a same direction. The drawn carbon nanotube film 132 includes a plurality of successive and ordered carbon nanotubes 134 joined end-to-end lengthwise by van der Waals force therebetween. The thickness of the drawn carbon nanotube film 132 can be in a range from about 10 nanometers to about 500 nanometers. The drawn carbon nanotube film 132 is a free-standing film. The term "free-standing" includes, but is not limited to, a structure that does not require support from or by a substrate or other foundation and can sustain its own weight when it is hoisted by a portion thereof without damage to the structural integrity of the whole film.

Figure 3:
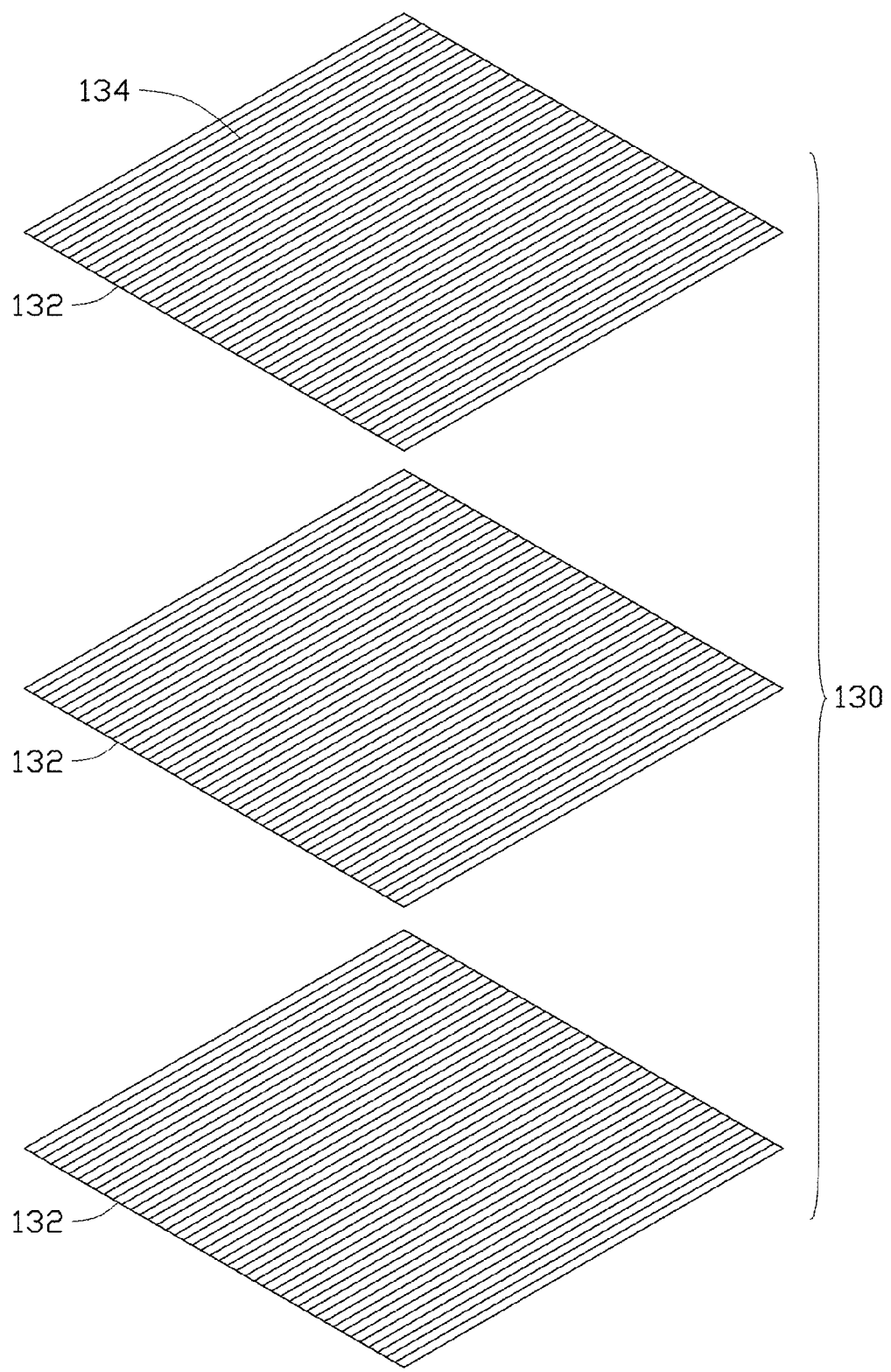
FIG. 3 shows another carbon nanotube structure of the liquid lens of FIG. 1.
Figure 4:
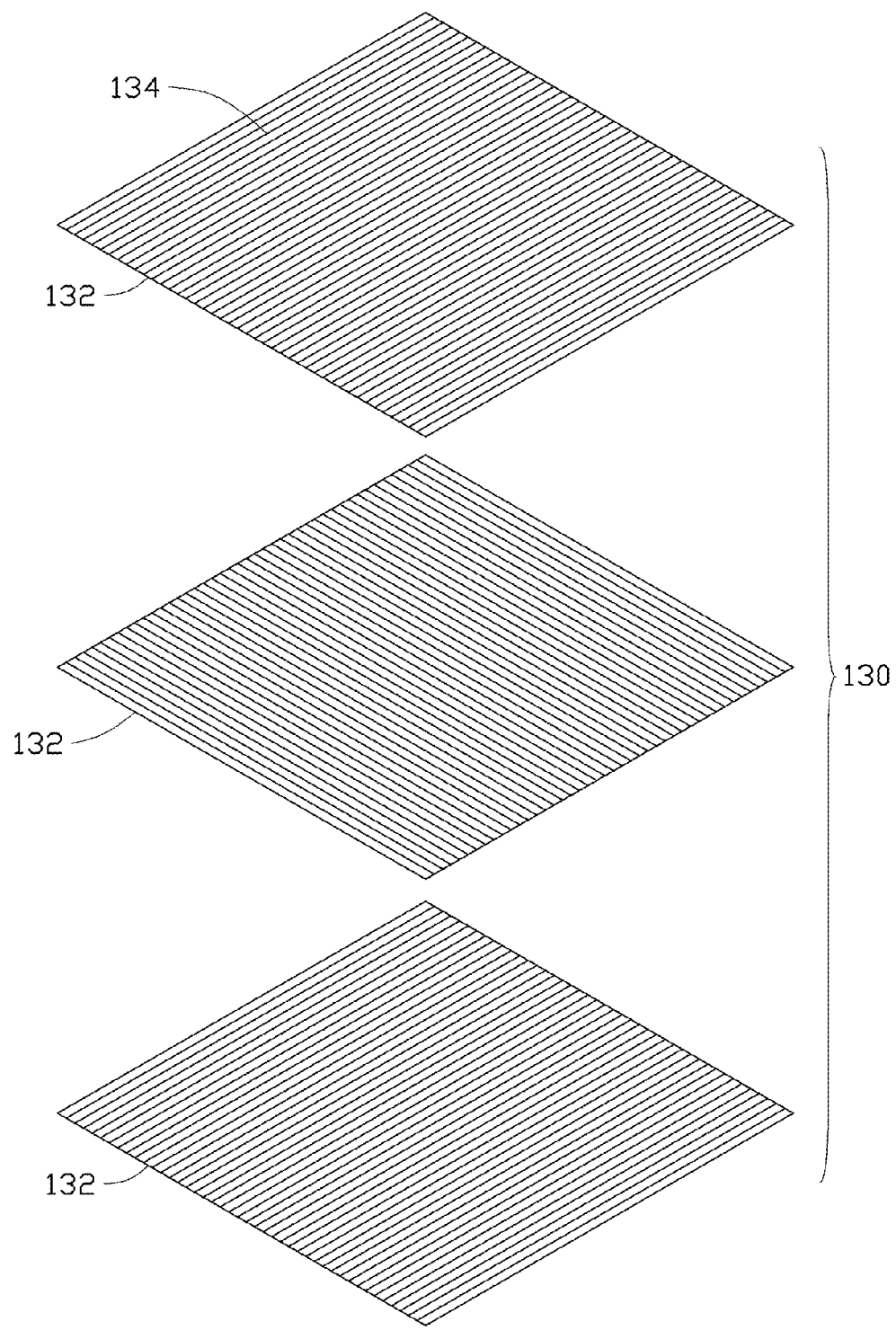
FIG. 4 shows one carbon nanotube structure of the liquid lens of FIG. 1.
Figure 5:
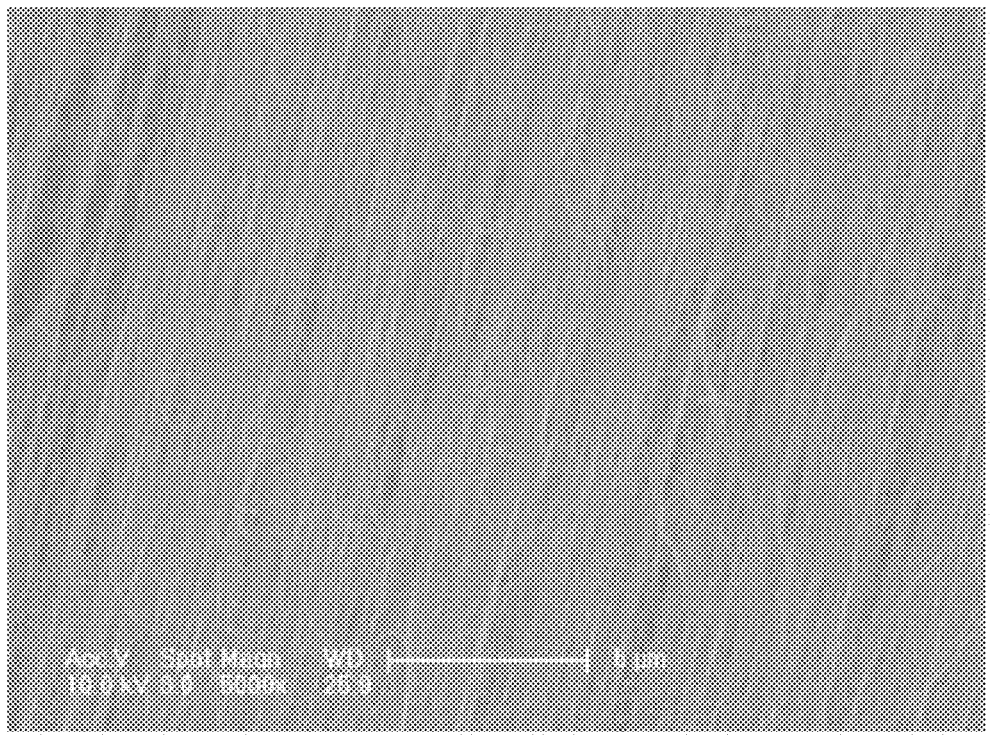
FIG. 5 is a Scanning Electron Microscope (SEM) image of a drawn carbon nanotube film.

The carbon nanotube structure 140 can include a plurality of carbon nanotube drawn films 132 stacked with each other. Adjacent drawn carbon nanotube films 132 combine by van der Waals force. An angle between the aligned directions of the carbon nanotubes in two adjacent carbon nanotube films 132 can range from about 0 degrees to about 90 degrees. When the carbon nanotube structure 140 includes more than one drawn carbon nanotube films 132 stacked on each other, the mechanical strength and toughness of the carbon nanotube structure 140 is increased, but the transparency of the carbon nanotube structure 140 is decreased. Therefore, the number of layers of the carbon nanotube films 132 should be limited to less than 10 layers. In one embodiment, the carbon nanotube structure 140 includes three layers of drawn carbon nanotube films 132. FIG. 3 shows that in one embodiment, the carbon nanotube structure 140 includes three layers of drawn carbon nanotube films 132. The angle between the aligned directions of the carbon nanotubes in two adjacent carbon nanotube films 132 is 0 degrees. Referring to FIG. 4, in one embodiment, the angle between the aligned directions of the carbon nanotubes in two adjacent carbon nanotube films 132 is 90 degrees.

The carbon nanotubes 134 of the drawn carbon nanotube film 132 are aligned lengthwise along a same direction. The carbon nanotubes 134 of at least one drawn carbon nanotube film 132 of the carbon nanotube structure 140 are aligned in line from the first electrode 150 to the second electrode 160. The high electrical conductivity of the carbon nanotubes 134 along the lengthwise direction promotes the efficient working of the liquid lens 10.

The liquid lens 10 has a fixed focal length when there is no voltage applied on the carbon nanotube structure 140. FIG. 1 shows that when a voltage is applied on the carbon nanotube structure 140, the temperature of the carbon nanotube structure 140 is increased. The carbon nanotube structure 140 transfers heat to the gaseous material 120, and the temperature of the gaseous material 120 increases. The gaseous material 120 will be heated by the carbon nanotube structure 140 and thus expand. Therefore, a pressure would be applied on the liquid material 130, and the shape of the soft portion 114 changes. The focus length of the liquid lens 10 changes with the shape change of the soft portion 114. Therefore the focal length of the liquid lens 100 can be adjusted by changing the voltage applied to the carbon nanotube structure 140.

Figure 6:
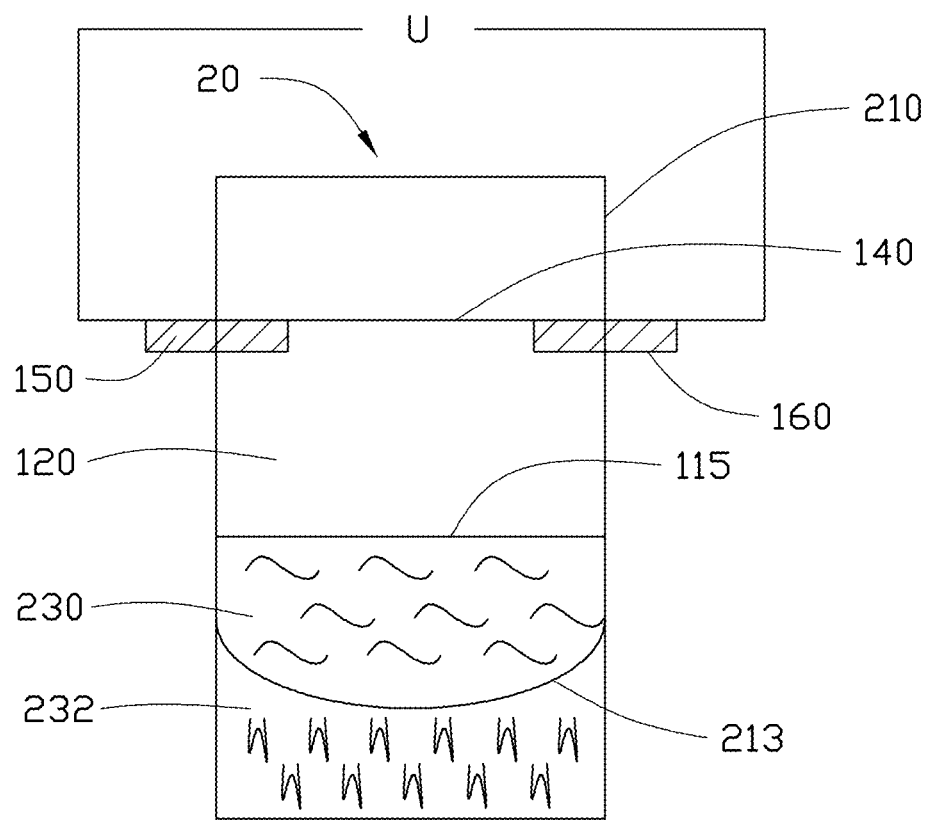
FIG. 6 shows a cross-sectional view of a liquid lens of another embodiment.

FIG. 6 shows that another embodiment of present disclosure provides a liquid lens 20. The liquid lens 20 includes a sealed shell 210, a gaseous material 120, a carbon nanotube structure 140, a first electrode 150, a second electrode 160, a membrane 115, a first liquid material 230, and a second liquid material 232. The gaseous material 120, the first liquid material 230, the second liquid material 232 and the carbon nanotube structure 140 are located inside of the sealed shell 210. The carbon nanotube structure 140 is embedded in the gaseous material 120, and spaced with the first liquid material 230 and the second liquid material 232. The gaseous material 120 is separated by the first liquid material 230 and the second liquid material 232 via the membrane 115. The first electrode 150 and the second electrode 160 are electrically connected with the carbon nanotube structure 140.

The sealed shell 210 holds the gaseous material 120, the first liquid material 230, the second liquid material 232, and the carbon nanotube structure 140. The sealed shell 210 is made of a rigid material, such as glass, quartz, plastic, or resin, for example. The rigid materials of the sealed shell 210 make sure the sealed shell 210 does not easily deform, the efficiency and stability of liquid lens 20 is maintained. In one embodiment, the sealed shell 210 is made of a transparent non-conductive hard glass.

The sealed shell 210 can be a tube shape, such as cylinder. The diameter of the sealed shell can be in a range from about 1 millimeter to about 10 centimeters. In one embodiment, the diameter of the sealed shell is 1 centimeter.

Further, an internal surface 213 of the sealed shell 210 is hydrophilic and lipophobic.

The first liquid material 230 and the second liquid material 232 are transparent. The density of the first liquid material 230 is less than the density of the second liquid material 232. The first liquid material 230 is oleophylic. The second liquid material 232 is hydrophilic. The first liquid material 230 is located between the gaseous material 120, and the second liquid material 232. The first liquid material 230 is contacted with the second liquid material 232.

The first liquid material 230 is oleophylic, and the second liquid material 232 is hydrophilic. Because the internal surface 213 of the sealed shell 210 is hydrophilic and lipophobic, the interface between the first liquid material 230 and the second liquid material 232 forms a convex surface. Therefore, the focus length of the liquid lens 20 can be adjusted by the interface between the first liquid material 230 and the second liquid material 232.

It is to be understood that the above-described embodiments are intended to illustrate rather than limit the disclosure. Variations may be made to the embodiments without departing from the spirit of the disclosure as claimed. It is understood that any element of any one embodiment disclosed can be incorporated with any other embodiment. The above-described embodiments illustrate the scope of the disclosure but do not restrict the scope of the disclosure.

What is claimed is:

1. A liquid lens comprising: a shell which is sealable, a membrane a gaseous material, a carbon nanotube structure, a first electrode, a second electrode, and a liquid material, wherein the membrane, the gaseous material, the carbon nanotube structure and the liquid material are sealed inside the shell, the gaseous material and the liquid material are separated from each other by the membrane inside the shell, the carbon nanotube structure is intermixed with the gaseous material, and the first electrode and the second electrode are separately located at two opposite sides of the shell, and electrically connected to the carbon nanotube structure.

2. The liquid lens of claim 1, wherein the gaseous material occupies about 10% to about 50% by volume of an interior of the shell.

3. The liquid lens of claim 1, wherein the carbon nanotube structure comprises at least one drawn carbon nanotube film.

4. The liquid lens of claim 3, wherein the at least one drawn carbon nanotube film comprises a plurality of carbon nanotubes aligned along a same direction, and a thickness of the at least one drawn carbon nanotube film is in a range from about 10 nanometers to about 500 nanometers.

5. The liquid lens of claim 3, wherein the number of the at least one drawn carbon nanotube film is less than 10.

6. The liquid lens of claim 1, wherein the shell comprises a hard portion and a soft portion.

7. The liquid lens of claim 6, wherein the hard portion is rigid and comprises glass, quartz, plastic or resin.

8. The liquid lens of claim 6, wherein the soft portion flexible and comprises polytene, polypropylene, or polymethylmethacrylate.

9. The liquid lens of claim 6, wherein the soft portion defines a convex surface.

10. The liquid lens of claim 6, wherein a pressure of the gaseous material sealed inside the shell is in a range from 0.5 atmosphere to 1.5 atmosphere.

11. A liquid lens comprising:
a shell being transparent and rigid, the shell being configured to be sealed;
a gaseous material sealed inside of the shell;
a carbon nanotube structure sealed inside of the shell, wherein the carbon nanotube structure is permeated by the gaseous material;
a first electrode and a second electrode spaced with each other, each of the first and the second electrodes being electrically connected with the carbon nanotube structure;
a membrane configured to be sealed inside of the shell;
a first liquid material sealed inside of the shell, wherein the first liquid material is separated from the gaseous material by the membrane inside the shell; and
a second liquid material sealed inside of the shell, wherein the second liquid material is in contact with the first liquid material, and the first liquid material is located between the gaseous material and the second liquid material, an interface between the first liquid material and the second liquid material is a convex surface.

12. The liquid lens of claim 11, wherein the gaseous material occupies about 10% to about 50% by volume of an interior of the shell.

13. The liquid lens of claim 11, wherein a pressure of the gaseous material sealed inside of the shell is in a range from 0.5 atmosphere to 1.5 atmosphere.

14. The liquid lens of claim 11, wherein the shell is made of glass, quartz, plastic or resin.

15. The liquid lens of claim 11, wherein a density of the first liquid material is less than the density of the second liquid material.

16. The liquid lens of claim 11, wherein the carbon nanotube structure comprises at least one drawn carbon nanotube film.

17. The liquid lens of claim 16, wherein the at least one drawn carbon nanotube film comprises a plurality of carbon nanotubes aligned along a same direction, and a thickness of the at least one drawn carbon nanotube film is in a range from about 10 nanometers to about 500 nanometers.

18. The liquid lens of claim 11, wherein the first liquid material is oleophylic.

19. The liquid lens of claim 18, wherein the second liquid material is hydrophilic.

20. The liquid lens of claim 18, wherein the shell comprises an internal surface which is hydrophilic and lipophobic.

* * * * *

UNITED STATES PATENT AND TRADEMARK OFFICE
CERTIFICATE OF CORRECTION

PATENT NO. : 8,837,054 B2
APPLICATION NO. : 13/908112
DATED : September 16, 2014
INVENTOR(S) : Jie Li, Kai-Li Jiang and Shou-Shan Fan It is certified that error appears in the above-identified patent and that said Letters Patent is hereby corrected as shown below:

Please amend Item (30) regarding "Foreign Application Priority Data" on the title page of the Patent with the following:

(30)   Foreign Application Priority Data

Jun. 4, 2012 (CN) ....................2012101805456

Signed and Sealed this
Second Day of August, 2016

Michelle K. Lee
*Director of the United States Patent and Trademark Office*